(12) United States Patent
Nichols et al.

(10) Patent No.: US 7,706,109 B2
(45) Date of Patent: Apr. 27, 2010

(54) LOW THERMAL COEFFICIENT OF RESISTIVITY ON-SLIDER TUNNELING MAGNETO-RESISTIVE SHUNT RESISTOR

(75) Inventors: Mark Nichols, San Jose, CA (US); Bill Edward Higgins, Palo Alto, CA (US); Michael Mallary, Sterling, MA (US); Lydia Baril, Bouc Bel Air (FR)

(73) Assignee: Seagate Technology LLC, Scotts Valley, CA (US)

( * ) Notice: Subject to any disclaimer, the term of this patent is extended or adjusted under 35 U.S.C. 154(b) by 635 days.

(21) Appl. No.: 11/582,851

(22) Filed: Oct. 17, 2006

(65) Prior Publication Data

US 2007/0091512 A1    Apr. 26, 2007

Related U.S. Application Data

(60) Provisional application No. 60/727,623, filed on Oct. 18, 2005.

(51) Int. Cl.
*G11B 5/39* (2006.01)
*G11B 5/40* (2006.01)

(52) U.S. Cl. .................................. 360/324.2; 360/323

(58) Field of Classification Search ................ 360/323, 360/324.2, 324.1, 324.11, 324.12
See application file for complete search history.

(56) References Cited

U.S. PATENT DOCUMENTS

| 5,729,410 | A | | 3/1998 | Fontana, Jr. et al. | |
|---|---|---|---|---|---|
| 5,773,566 | A | * | 6/1998 | Nagata et al. | ............ 252/519.1 |
| 6,275,361 | B1 | | 8/2001 | Wallash et al. | |
| 6,400,534 | B1 | | 6/2002 | Klaassen et al. | |
| 6,650,511 | B2 | | 11/2003 | Hsiao et al. | |
| 6,667,842 | B2 | * | 12/2003 | Comeau et al. | ............ 360/67 |
| 6,795,280 | B1 | | 9/2004 | Song et al. | |
| 6,914,758 | B2 | | 7/2005 | Ryan et al. | |
| 6,935,923 | B2 | | 8/2005 | Burbank et al. | |
| 7,035,062 | B1 | | 4/2006 | Mao et al. | |
| 7,054,085 | B2 | | 5/2006 | Lin et al. | |
| 7,151,654 | B1 | * | 12/2006 | Mao et al. | ............ 360/324.2 |
| 7,298,597 | B2 | * | 11/2007 | Carey et al. | ............ 360/324.2 |
| 7,359,161 | B2 | * | 4/2008 | Li et al. | ............ 360/324.1 |
| 7,389,577 | B1 | * | 6/2008 | Shang et al. | ............ 29/603.14 |
| 7,545,608 | B2 | * | 6/2009 | Araki et al. | ............ 360/319 |
| 2004/0241951 | A1 | * | 12/2004 | Amadon et al. | ............ 438/382 |
| 2004/0264067 | A1 | * | 12/2004 | Lin et al. | ............ 360/324.2 |
| 2006/0198057 | A1 | * | 9/2006 | Leung et al. | ............ 360/323 |

* cited by examiner

*Primary Examiner*—Jefferson Evans
(74) *Attorney, Agent, or Firm*—Westman, Champlin & Kelly, P.A.

(57) ABSTRACT

A slider includes a Tunneling Magneto-Resistive (TuMR) read sensor and a shunt resistor connected in parallel. The shunt resistor may be located in a read structure of the slider. The shunt resistor may reduce a total resistance of the read structure and any corresponding impedance mismatch between the read structure, a transmission line, and a preamplifier. The shunt resistor may be made of a material having a near zero thermal coefficient of resistivity (TCR) to test a quality of the TuMR read sensor. The TuMR read sensor may be deemed defective if its TCR deviates from a population average by a specific criterion. The TuMR read sensor may include a MgO tunneling barrier to improve signal strength. The TuMR read sensor may include a free layer that is able to be saturated with a perpendicular background field to calculate a more accurate TCR of the TuMR read sensor.

30 Claims, 8 Drawing Sheets

LOW THERMAL COEFFICIENT OF RESISTIVITY ON-SLIDER TUNNELING MAGNETO-RESISTIVE SHUNT RESISTOR

CROSS-REFERENCE TO RELATED PATENT APPLICATIONS

Embodiments of the present invention relate to U.S. Provisional Application Ser. No. 60/727,623 filed Oct. 18, 2005, entitled "Low TCR on Slider TuMR Shunt Resistor", the contents of which are incorporated by reference herein and which is a basis for a claim of priority.

BACKGROUND OF THE INVENTION

1. Field of the Invention

Embodiments of the present invention relate to storage devices. In particular, embodiments of the present invention relate to an on-slider shunt resistor with a low thermal coefficient of resistivity (TCR) for reducing the impedance mismatch between a tunneling magneto-resistive (TuMR) read sensor, a transmission line, and a preamplifier while preserving the ability to measure the TCR of the TuMR read sensor accurately to eliminate defective TuMR read sensors.

2. Related Art

A major goal among many disk drive manufacturers is to continue to increase an amount of data that can be stored on a recording medium while still maintaining data integrity and disk drive reliability. Likewise, another major goal among many disk drive manufacturers is to continue to increase the rate at which disk drives read data from and write data to a recording medium while likewise maintaining data integrity and disk drive reliability.

When data is read, a magneto-resistive (MR) element exhibits a change in electrical resistance as a function of external magnetic field. In storage systems, a magnetic bit on the disk modulates the resistance of the MR element as the bit passes below. The change in resistance can be detected by passing a sense current through the MR element and measuring the voltage across the MR element. The disk drive uses the resultant signal to recover data from the magnetic storage medium. Depending on the structure of a device, the MR effect can fall into different categories, such as anomalous MR, giant MR (GMR), and tunneling MR (TuMR). The use of the latter has been the latest technique to increase the rate at which disk drives read data.

However, increasing the rate at which data is read can be problematic. In order to increase the data transmission rate, the frequency of the signal must be increased accordingly. However, a signal using a high frequency can be subject to distortion, frequency dependent gain, noise increase, and phase shifting.

Figure 7:
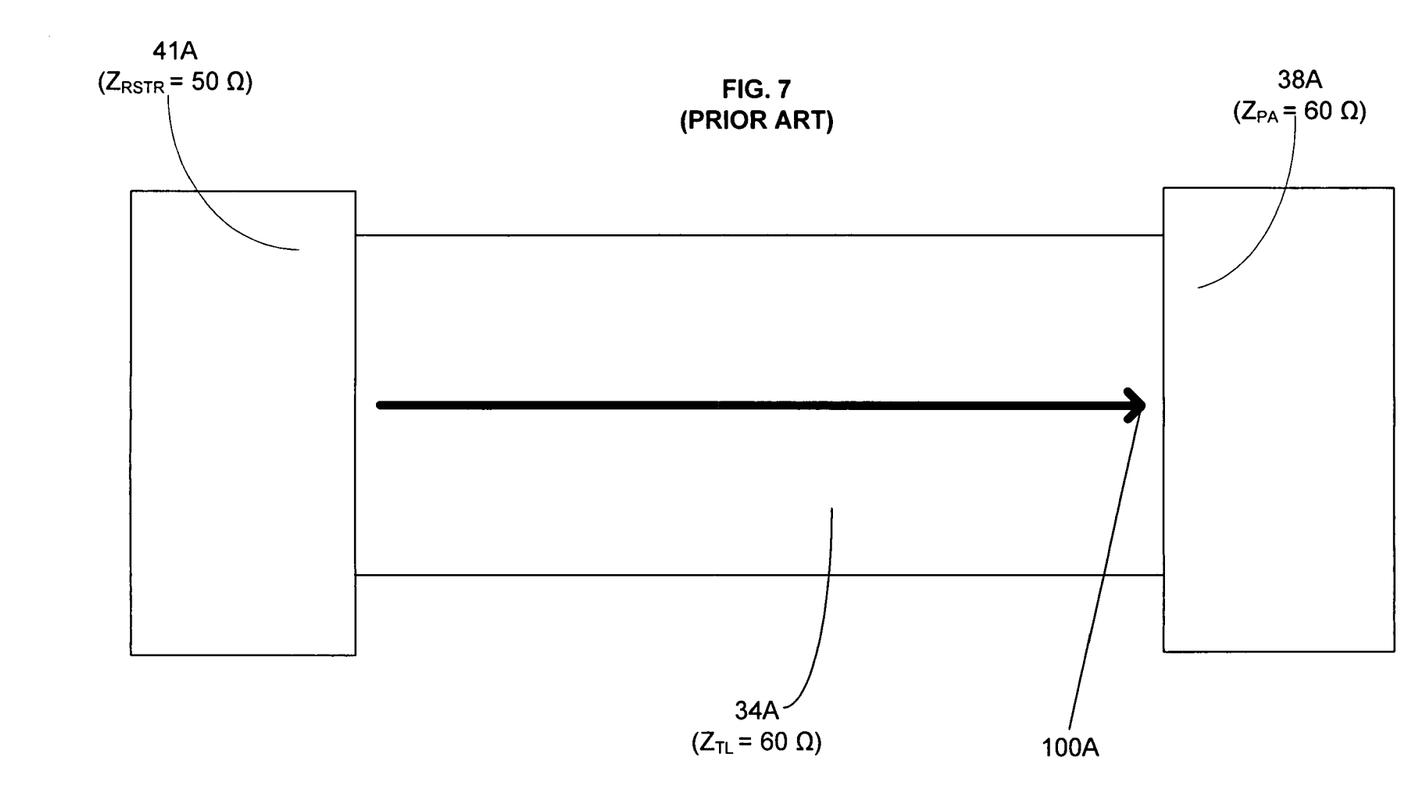
FIG. 7 illustrates a diagram of a conventional GMR device transmitting data to a preamplifier via a transmission line when an impedance of a read structure matches an impedance of the transmission line, and an impedance of the preamplifier.

Perhaps most problematic for TuMR devices is a reduction in high frequency capability of a TuMR read sensor due to a high resistance at the TuMR read sensor. Moreover the increased resistance may correspond to an impedance mismatch between the read structure containing the TuMR read sensor, a transmission line, and a preamplifier. In an ideal system, the impedance of the read structure, the transmission line, and the preamplifier match, or are about equal, thus allowing a signal or pulse to move from the TuMR read sensor along the transmission line to the preamplifier with minimal distortion due to frequency dependent gain and time delay. For example, FIG. 7 illustrates a GMR device, where the impedance ($Z_{RSTR}$) of the read structure 41A may be about 50Ω, while the impedance ($Z_{PA}$) of the preamplifier 38A and the impedance ($Z_{TL}$) of the transmission line 34A may be about 60Ω. As such, the read structure 41A can transmit the signal to the preamplifier 38A via the transmission line 34A with limited distortion that would result from frequency dependent insertion loss if $Z_{RSTR}$ was very much larger than $Z_{TL}$ or $Z_{PA}$. This is because the purpose of a transmission line is to convey electrical energy from one point to another, so the ideal situation would be for all of the original signal energy to travel from the source to the load and then be completely absorbed or dissipated by the load for maximum signal-to-noise ratio. As a result, when the impedances match, the preamplifier 38A is able to absorb the transmitted signal 100A in its entirety.

Figure 8:
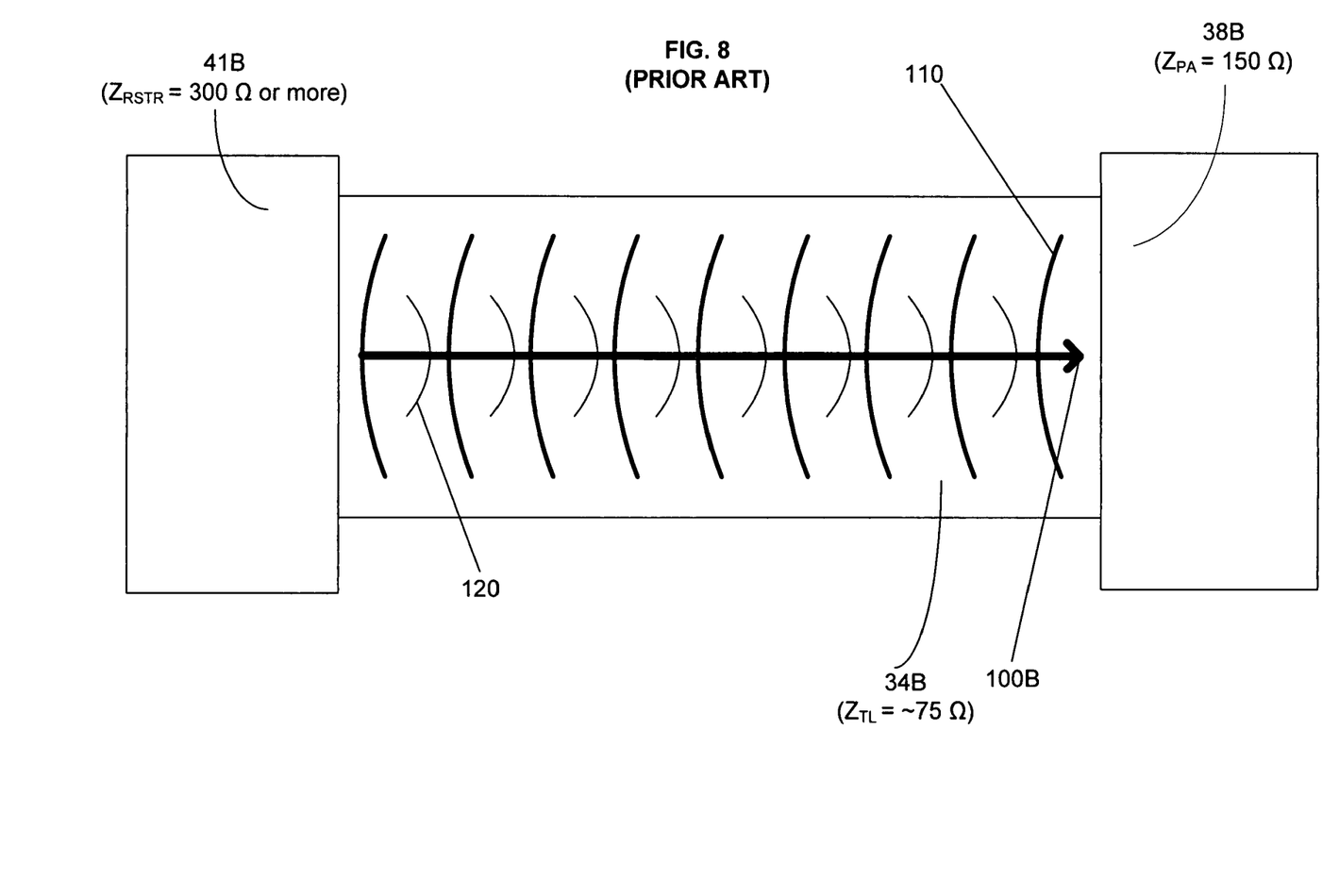
FIG. 8 illustrates a diagram of a conventional TuMR device transmitting data to a preamplifier via a transmission line when an impedance of the transmission line does not match an impedance of the preamplifier.

However, FIG. 8 illustrates a conventional TuMR device, where an impedance of a read structure 41B, a transmission line 34B, and a preamplifier 38B do not match due to a very high resistance of a TuMR read sensor within the read structure 41B. As is evident, the read structure 41B of a TuMR device has an impedance (300Ω or more) that is tremendously larger than the impedance of the preamplifier 38B (about 150Ω) or the transmission line 34B (~75Ω). In this example the impedance of the preamplifier is set at an intermediate value between that of the TuMR and the transmission line 34B in order to achieve an engineering compromise between insertion loss distortion due to the higher TuMR resistance and distortion due to reflection of high frequency components 120 at the mismatched junction between the transmission line 34B and the preamplifier 38B. As a result, the preamplifier 38B will not be able to absorb the low and high frequency components of an incoming pulse 100B (i.e., data read from the recording medium by the TuMR read sensor) with the same efficiency and time delay, causing distortion. In addition, the TuMR read sensor will not be able to absorb the high frequency noise from the preamp which will echo along the transmission line 34B. As expected, the pulse distortion and extra noise degrades the reliability and integrity of the transmitted data, and essentially renders the desired high data rates of TuMR devices less useful.

There have been several proposals to reduce the high resistance of the TuMR read sensor and the corresponding impedance mismatch between the read structure, transmission line, and the preamplifier. For example, using a thin tunneling layer, which is a layer of insulating material located between two ferromagnetic layers within the TuMR read sensor, or a tunneling layer made of $TiO_x$ (instead of $AlO_x$) have been suggested to reduce the TuMR read sensor resistance. However, thinning the tunneling layer beyond a critical point radically reduces the sensor response (e.g., ΔR/R) of the TuMR read sensor and results in reliability problems due to the tunneling layer having nascent pinholes and actual pinholes, which are nano-sized conductive shorts that form in between the two ferromagnetic layers within the TuMR read sensor. Pinholes allow a parasitic current to pass from one ferromagnetic layer to the other, which affects the magneto-resistance of the device, and ultimately the reliability of the device. Likewise, composing the tunneling layer of $TiO_x$ inadequately reduces the TuMR read sensor resistance required for high data transmissions for narrow read widths.

In addition, using a long stripe height of the TuMR read sensor has been proposed to reduce the total resistance of the read structure because resistance is inversely related to the area of resistance of the tunneling layer within the TuMR read sensor. Thus, as area increases due to a longer stripe height, resistance of the tunneling layer decreases accordingly. However, using a long stripe height has proven to be equally problematic since a longer stripe height can add shot noise, increase Thermal Magnetic Noise, and produce localized heating.

Furthermore, using a resistor at the preamplifier had been proposed to prevent a preamplifier designed to deliver a bias current to a low (~50Ω) resistance GMR read sensor from damaging a more sensitive TuMR read sensor with a higher resistance (~400Ω). The shunt resistor located at the preamplifier provides an alternate path for damaging bias currents, as most bias current are greater than 2 mA, while the TuMR read sensor damage threshold is less than 1 mA. However, this technique only reduces the impedance at the preamplifier, thus leaving the high resistance of the read structure unchanged. As a result, the impedance mismatch continued to exist.

In addition, previous shunt resistor applications, such as U.S. Pat. No. 7,054,085 entitled "Use of Shunt Resistor with Large RA Product Tunnel Barriers," did not deal with the effect of the shunt resistor on a measurement of a TuMR read sensor thermal coefficient of resistivity (TCR). TCR is a measure of the slope of the resistance versus temperature (normalized to room temperature), and is useful for testing for defective TuMR read sensors. Without measuring the TCR of the TuMR read sensor, it is difficult to distinguish a defective TuMR read sensor from the norm. An ideal TuMR read sensor has a specific TCR, whereas a TuMR read sensor containing pinholes or nascent pinholes will have a differing TCR. Therefore, measuring the TCR of the TuMR read sensor can determine whether the TuMR read sensor is defective due to the presence of pinholes. However, this task can be difficult, if not impossible, if, for example, the read structure contains a shunt resistor with a large TCR because such a resistor would impact the calculation of the TCR of the TuMR read sensor, thus preventing accurate testing.

In light of the above-mentioned problems, there is a significant need for reducing the high resistance of the TuMR read sensor and the corresponding impedance mismatch between the read structure, the transmission line, and the preamplifier while preserving the ability to accurately measure the TCR of the TuMR read sensor to detect defective parts efficiently.

SUMMARY OF THE DISCLOSURE

Embodiments of the present invention allow for reducing a total resistance of a read structure containing a tunneling magneto-resistive (TuMR) read sensor and a corresponding impedance mismatch between the read structure, a transmission line, and a preamplifier while preserving the ability to accurately measure a thermal coefficient of resistivity of the TuMR read sensor to detect defective parts.

In various embodiments of the present invention, a shunt resistor may be connected in parallel to a tunneling magneto-resistive read sensor in a read structure located on a slider for the read structure. The shunt resistor may be configured for at least partially reducing a total resistance of the read structure. By reducing the total resistance of the read structure, pulse distortions and frequency dependent gain and time delay can be minimized, thus increasing a quality of a transmitted signal.

In addition, the shunt resistor may be made of a material having a thermal coefficient of resistivity (TCR) where the absolute value of the TCR is less than about 0.2%/° C., such as, but not limited to, $Cu_{96.5}Mn_{3.5}$, $Ni_{80}Fe_{20}$, $Cu_{60}Ni_{40}$, $Cu_{84}Mn_{12}Ni_4$, $Ni_{80}Cr_{20}$, $Ni_{60}Fe_{24}Cr_{16}$, $Cu_{88}Sn_{12}$, $Cu_{95}Sn_5$, $Cu_{91}Mn_7Fe_2$, $Au_{67}Cu_{15}Ag_{18}$, $Au_{67}Ag_{33}$, or the like. Composing the shunt resistor of a near-zero TCR may help to accurately determine a quality of the TuMR read sensor without added error resulting from the shunt resistor.

In various embodiments of the present invention, the shunt may be made of a material having a resistivity of about 20 μΩcm (micro-ohm centimeter) or less, such as $Cu_{96.5}Mn_{3.5}$, $Ni_{80}Fe_{20}$, $Cu_{88}Sn_5$, $Cu_{95}Sn_5$, $Cu_{91}Mn_7Fe_2$, $Au_{67}Cu_{15}Ag_{18}$, $Au_{67}Ag_{33}$, or the like.

In various embodiments of the present invention, the read structure may be configured for use with a transmission line and a preamplifier. The shunt resistor may be configured to reduce the impedance mismatch between the read structure, the transmission line, and the preamplifier. By reducing the impedance mismatch, signal distortion and bit error rate is dramatically reduced.

In various embodiments of the present invention, the TCR of the TuMR read sensor can be calculated to determine the quality of the TuMR read sensor. The TuMR read sensor may be deemed defective if the TCR of the TuMR read sensor deviates from a population average by a specific criterion.

In various embodiments of the present invention, a heat source located on the slider may be configured to raise the temperature of the read structure during a process for testing the quality of the TuMR read sensor. In various embodiments of the present invention, the heat source comprises a Fly Height Adjustment heater. In further embodiments of the present invention, the heat source comprises a write coil.

In various embodiments of the present invention, a tunneling layer of the TuMR read sensor may be composed of MgO, which greatly increases strength of the signal transmitted by the TuMR read sensor, as well as improves signal-to-noise ratio of the transmitted data.

In various embodiments of the present invention, a free layer of the TuMR read sensor may be saturated with a perpendicular background field. In order to accurately measure the total resistance of the read structure, the perpendicular background field prevents the resistance of the TuMR read sensor from affecting the measurement of the total resistance of the read structure, resulting in a more accurate TCR of the TuMR read sensor.

In various embodiments of the present invention, the TuMR read sensor may be located at least partially between at least two read shields. The shunt resistor may be located at least partially adjacent to at least one of the read shields. Also in various embodiments, at least one of the read shields may be located between the TuMR read sensor and the shunt resistor. This may prevent the shunt resistor from possibly heating the TuMR read sensor, which may lead to quality testing errors.

DETAILED DESCRIPTION OF PREFERRED EMBODIMENTS

Reference will now be made to the accompanying drawings, which assist in illustrating various pertinent features of embodiments of the present invention. Although embodiments of the present invention will now be described primarily in conjunction with disk drives, it should be expressly understood that embodiments of the present invention may be applicable to other applications where magnetic recording of data is required or desired. In this regard, the following description of a disk drive is presented for purposes of illustration and description. Also, embodiments of the present invention are described in terms of perpendicular recording systems, but the teachings of embodiments of the present invention are readily extended to other systems such as longitudinal recording systems and the like.

Figure 1:
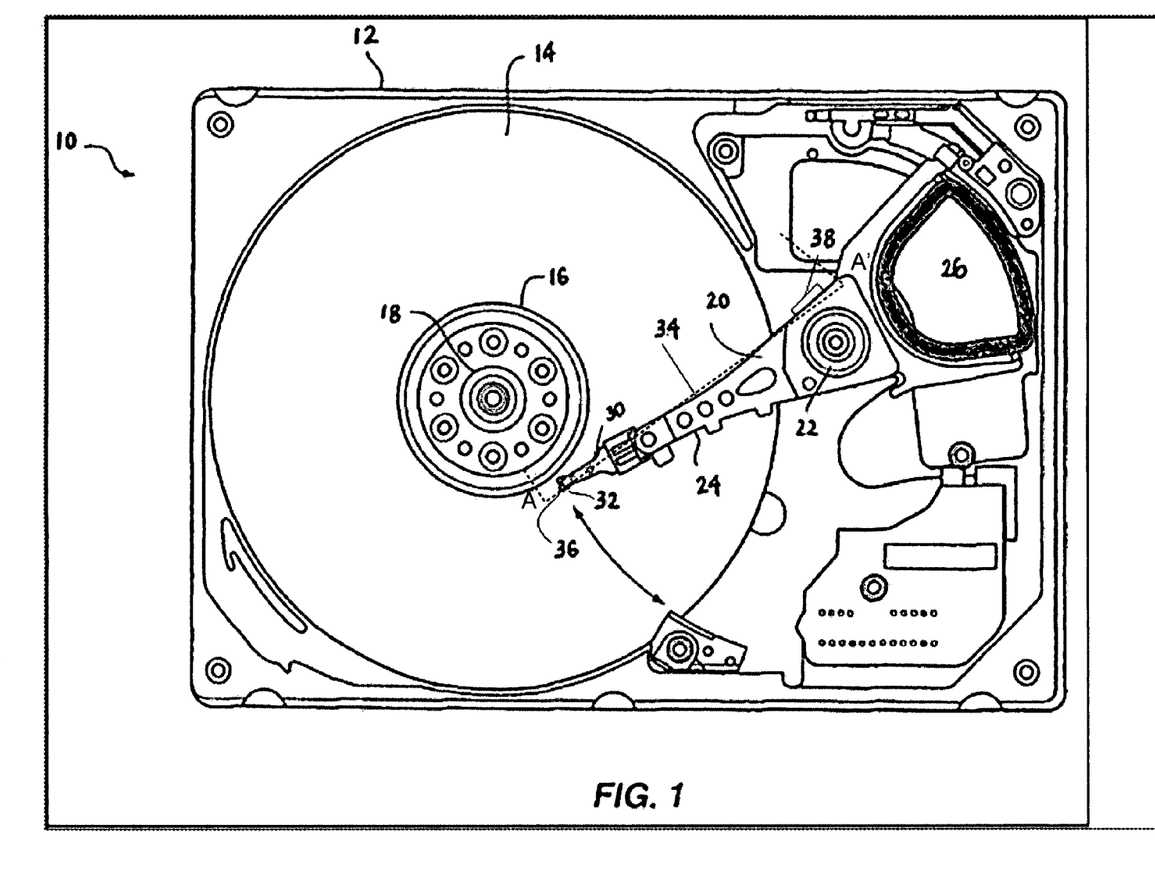
FIG. 1 illustrates a disk drive in accordance with an embodiment of the present invention.

FIG. 1 illustrates a disk drive 10 in accordance with an embodiment of the present invention. The disk drive 10 generally includes a base plate 12 and a cover (not shown) that may be disposed on the base plate 12 to define an enclosed housing or space for various disk drive components. The disk drive 10 includes one or more data storage disks 14 of any appropriate computer-readable data storage media. Typically, both of the major surfaces of each data storage disk 14 include a plurality of concentrically disposed tracks for data storage purposes. Each disk 14 is mounted on a hub or spindle 16, which in turn is rotatably interconnected with the disk drive base plate 12 and/or cover. Multiple data storage disks 14 are typically mounted in vertically spaced and parallel relation on the spindle 16. A spindle motor 18 coupled to the spindle 16 to spin the data storage disk 14 at an appropriate rate provides rotation of the disk 14.

The disk drive 10 also includes an actuator arm assembly 20 that pivots about a pivot bearing 22, which in turn is rotatably supported by the base plate 12 and/or cover. The actuator arm assembly 20 includes one or more individual rigid actuator arms 24 that extend out from near the pivot bearing 22. Multiple actuator arms 24 are typically disposed in vertically spaced relation, with one actuator arm 24 being provided for each major data storage surface of each data storage disk 14 of the disk drive 10. Other types of actuator arm assembly configurations could be utilized as well, such as an "E" block having one or more rigid actuator arm tips, or the like, that cantilever from a common structure. In any case, an actuator arm drive assembly, such as a voice coil motor 26, or the like, provides movement of the actuator arm assembly 20. The voice coil motor 26 may be a magnetic assembly that controls the operation of the actuator arm assembly 20 under a direction of control electronics 28.

The actuator arm assembly 20 may further include one or more load beam(s) or suspension(s) 30, where each suspension 30 may be attached to the free end of a respective actuator arm 24 and cantilever there from. Typically, the suspension 30 is biased generally toward its corresponding disk 14 by a spring-like force. A slider 32 is disposed at or near the free end of each suspension 30. The biasing forces exerted by the suspension 30 on its corresponding slider 32 thereby attempt to move the slider 32 in the direction of its corresponding disk 14. Typically, this biasing force is such that if the slider 32 were positioned over the corresponding disk 14 without the disk 14 being rotated at a sufficient velocity, the slider 32 would be in contact with the disk 14.

Signals may be exchanged between the head 36 and its corresponding data storage disk 14 for disk drive read/write operations. In this regard, the voice coil motor 26 is utilized to pivot the actuator arm assembly 20 to simultaneously move the slider 32 along a path and across the corresponding data storage disk 14 to position the head 36 at a desired or required radial position on the disk 14 (i.e., at an approximate location of a desired track on the data storage disk 14) for disk drive read/write operations.

Figure 2:
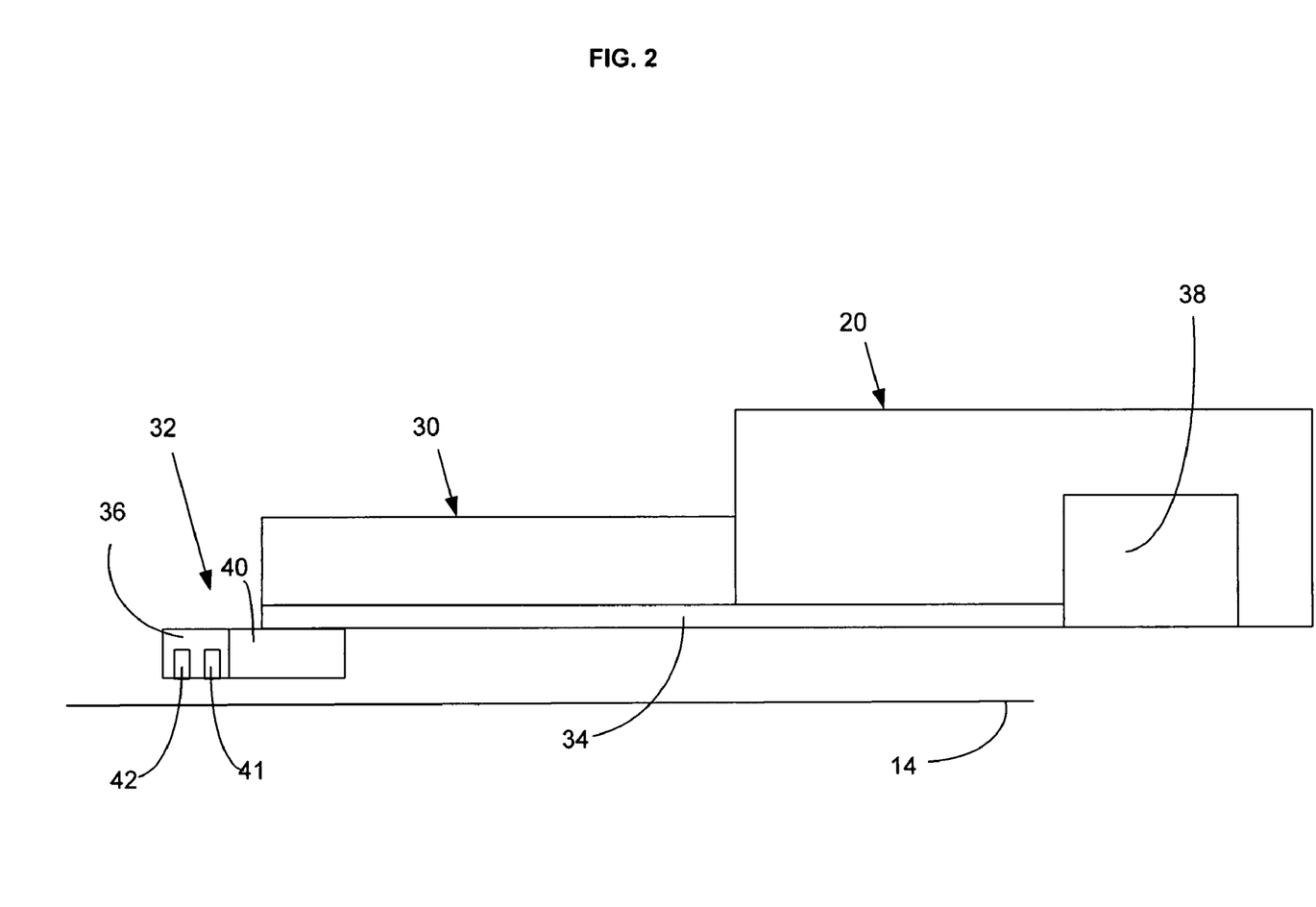
FIG. 2 illustrates a cross-sectional view of FIG. 1 along the line A-A' in accordance with an embodiment of the present invention.

FIG. 2 illustrates a cross-sectional view of FIG. 1 along the line A-A' in accordance with an embodiment of the present invention. The slider 32 may comprise a slider body 40 and the head 36 of the slider 32, wherein the slider body 40 may be a substrate of the head 36. The slider body 40 may be formed from various ceramic materials including, but not limited to, a composition of alumina and titanium-carbide, or the like. The slider body 40 may be connected to the suspension 30 at a top surface of the slider 32. In various embodiments, the suspension 30 is in contact with a portion of the top surface of the slider 32 that corresponds to a portion of the slider body 40. The slider 32 may be positioned over the corresponding disk 14.

The head 36 of the slider 32 is interconnected with a preamplifier 38 that may be located at the base of the arm assembly 20 of the disk drive 10 by a transmission line or "flex print" 34, such as a coaxial cable, or the like, that is typically mounted alongside the suspension 30. In various embodiments, the head 36 of the slider 32 comprises a read structure 41 and a write structure 42. The read structure 41 allows for reading magnetic fields from the corresponding disk 14. The write structure 42 allows for providing magnetic fields to the corresponding disk 14 to write data to the corresponding disk 14. In various embodiments of the present invention, the read structure 41 may transmit data, which is read by a tunneling magneto-resistive read sensor (discussed later), via the transmission line 34 to the preamplifier 38, which may be located, for example, at the base of the actuator arm assembly 20, and alternatively may be located in any other suitable position.

Figure 3:
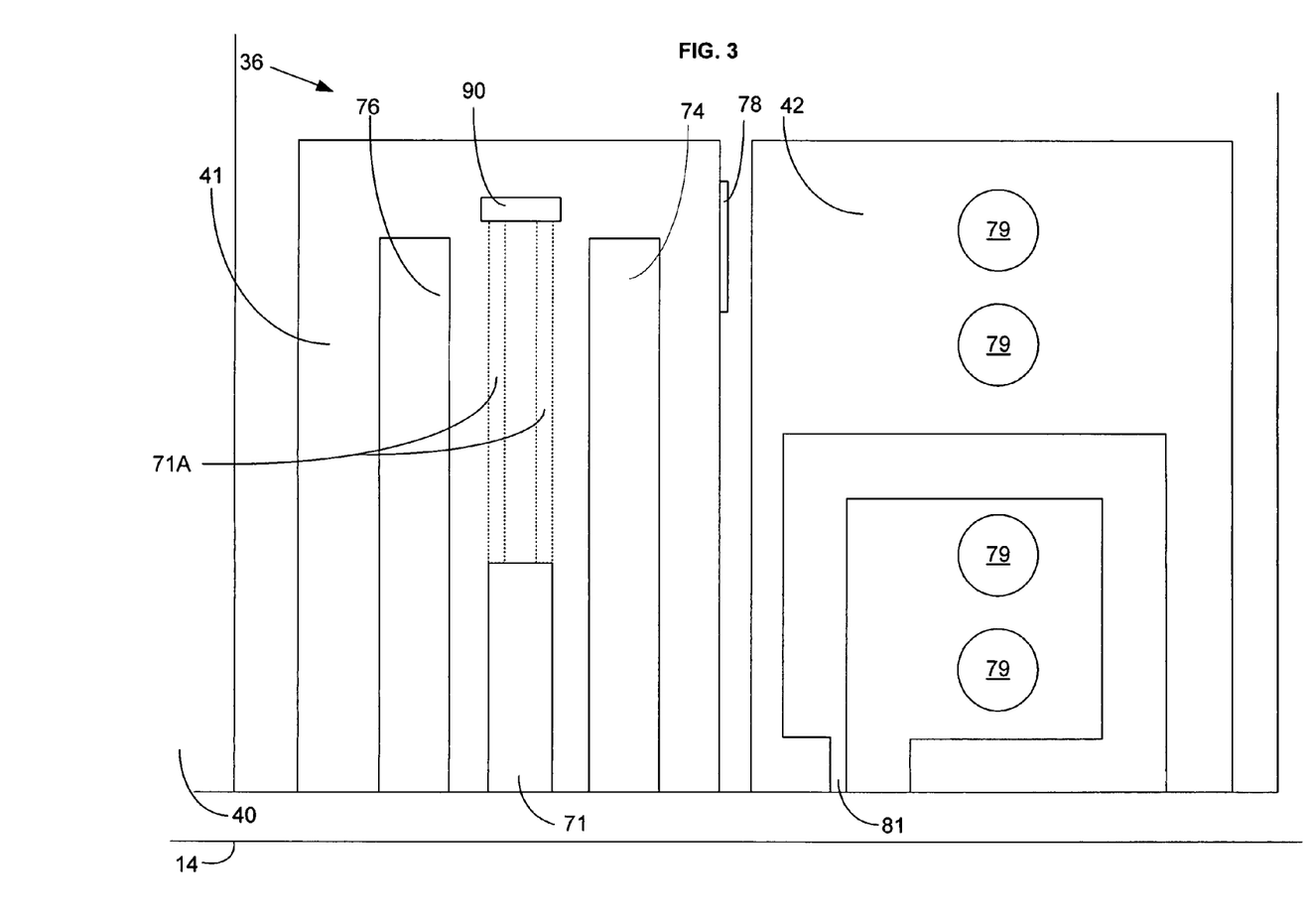
FIG. 3 illustrates a side view of a slider in accordance with an embodiment of the present invention.

FIG. 3. illustrates a side view of the transducer end of the slider 32 in accordance with embodiments of the present invention. In various embodiments of the present invention, the read structure 41 comprises a tunneling magneto-resistive (TuMR) read sensor 71 and a shunt resistor 90. The TuMR read sensor 71 may be configured to read magnetic fields from the corresponding disk 14. The shunt resistor 90 may be connected in parallel across leads 71A of the TuMR read sensor 71. Both the shunt resistor 90 and the TuMR read sensor 71 may be deposited on wafers as part of the same process. The shunt resistor 90 is configured for at least partially reducing the total resistance of the read structure 41 due to a high resistance produced by the TuMR read sensor 71. In various embodiments of the present invention, the shunt resistor 90 can be configured to reduce an impedance mismatch between the TuMR read sensor 71, the transmission line 34, and the preamplifier 38 by reducing the total impedance (i.e., the resistance) of the read structure 41 to more closely match the impedances of the transmission line 34 and preamplifier 38.

The shunt resistor 90 may be composed of a material having a near-zero thermal coefficient of resistivity (TCR). In various embodiments of the present invention, the shunt resistor 90 may be composed of a material having a TCR where the absolute value of the TCR is less than about 0.2%/° C., such as, but not limited to, $Cu_{96.5}Mn_{3.5}$ (0.02%/° C.), $Ni_{80}Fe_{20}$ (0.2%/° C.), $Cu_{60}Ni_{40}$ (0.002%/° C.), $Cu_{84}Mn_{12}Ni_{4}$ (−0.004%/° C.) $Ni_{80}Cr_{20}$ (0.01%/° C.), $Ni_{60}Fe_{24}Cr_{16}$ (0.04%/° C.), $Cu_{88}Sn_{12}$ (0.05%/° C.), $Cu_{95}Sn_{5}$ (0.1%/° C.), $Cu_{91}Mn_{7}Fe_{2}$ (0.012%/° C.), $Au_{67}Cu_{15}Ag_{18}$ (0.0529%/° C.), $Au_{67}Ag_{33}$ (0.065%/° C.), or the like. As discussed later, a shunt resistor 90 composed of a low TCR material may allow for TCR reliability testing of the TuMR read sensor 71. Typical products that call for low TCR materials, such as some fly height adjustment heaters, usually use $Ni_{80}Fe_{20}$, and such low TCR materials may be likewise used in a low TCR shunt resistor. However, an alloy, such as $Cu_{96.5}Mn_{3.5}$ has a TCR one-tenth that of $Ni_{80}Fe_{20}$, thus allowing for more accurate testing of the quality of the TuMR read sensor 71. In various embodiments of the present invention, the shunt resistor 90 may be made of a material having a negative TCR, such that the resistance of the shunt resistor 90 would decrease as temperature increases.

In various embodiments of the present invention, the shunt resistor 90 may be located far enough away from the TuMR read sensor 71, such that the shunt resistor 90 does not overheat the TuMR read sensor 71.

Using an on-slider shunt resistor 90 can be beneficial because a shunt resistor 90 can reduce the total resistance of the read structure 41 and any associated pulse distortion and frequency dependent gain and time delay not fully compensated by a finite impulse response filter (not shown). The shunt resistor 90 can also help reduce the impedance mismatch between the read structure 41, the transmission line 34, and the preamplifier 38. Matching the impedances may reduce signal distortion and dramatically reduce the bit error rate (BER) (i.e., less corrupted data), thus promoting the reliability and integrity of the transmitted data in TuMR devices. Likewise, this can be beneficial because the shunt resistor 90 can reduce the variability in net sensor resistance, as well as reducing the damage caused by electrostatic discharge events (i.e., momentary unwanted currents that can cause damage to the TuMR device).

After the shunt resistor 90 and the TuMR read sensor 71 are fabricated on wafers, the devices may be sliced into bars (or "bar lapped") to obtain a desired dimension of the TuMR read sensor 71. In various embodiments of the present invention, the TuMR read sensor 71 can be then tested for quality, because each TuMR read sensor 71 has a measurable TCR value $C_{TuMR}$ that can be matched to a population average to determine the quality of the TuMR read sensor 71. An ideal TuMR read sensor has a specific TCR (i.e., matches a population average by a certain amount), whereas a defective TuMR read sensor may have a differing TCR. In particular, the TuMR read sensor 71 may have a differing TCR, and thus be defective, if the TuMR read sensor 71 contains pinholes, which are small holes located within the TuMR read sensor 71, or nascent pinholes, which are essentially pinholes that have not yet formed. The presence of pinholes or nascent pinholes will lead to a lower absolute value of the TCR of the TuMR read sensor 71.

In various embodiments of the present invention, the TCR test can be performed by a fly height adjustment (FHA) heater 78. The FHA heater 78 may be located within the slider 36, for example on the read structure 41, on the write structure 42, or any other suitable location. Typically, the FHA heater 78 is configured to heat and expand the head 36 portion of the slider 32 in order to adjust the height at which the head 36 is "flying" over the corresponding disk 14. However, the FHA heater 78 can also be configured to perform the TCR test by driving a known power into the FHA heater 78 to raise the temperature of the read structure 41 to a known elevation of temperature ($\Delta T$) and measuring the change in resistance in a perpendicular background field produced by an external magnet 89 (refer to FIG. 4), for example, that saturates the free layer 86 so that one is not measuring the magnetic orientation induced resistance change of the TuMR read sensor 71 itself.

In further embodiments of the present invention, the TCR test can alternatively be performed by one or more write coils 79 located within the write structure 42. Write coils 79 are typically configured to produce a magnetic flux that passes through the write pole 81 to record data to the corresponding disk 14. However, as stated above, the write coils 79 can also be configured to perform the TCR test by driving a known power into the write coils 79 to raise the temperature of the read structure 41 to a known elevation of temperature for a measurable resistance change of the read structure 41. A perpendicular background field may also be applied when using the write coils 79 to perform the TCR test.

The low TCR of the shunt resistor 90 will help to minimize the impact of the shunt resistor 90 on the TCR test. If the shunt resistor 90 is made of a large positive TCR alloy, the TCR measurement of the TuMR read sensor 71 will be a complicated function of the resistance of the TuMR read sensor 71, the TCR of the TuMR read sensor 71, the resistance of the shunt resistor 90, and the TCR of the shunt resistor 90. Moreover, manufacturing variability of the shunt resistor 90 will further frustrate the calculation of the true TCR of the TuMR read sensor 71 to reject devices with pinholes or nascent pinholes that cause a low absolute value of TCR.

Figure 4:
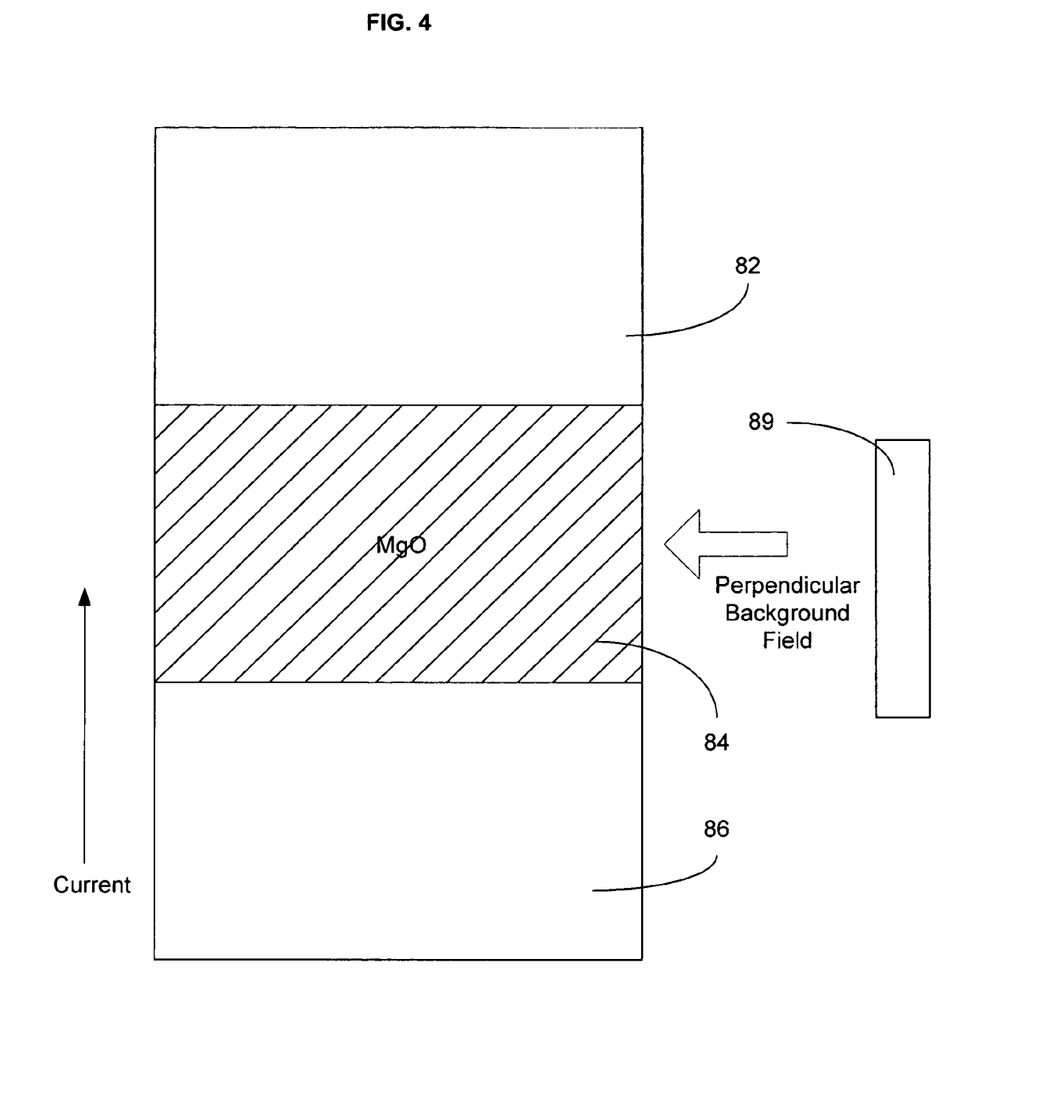
FIG. 4 illustrates various layers of a TuMR read sensor according to an embodiment of the present invention.

FIG. 4 illustrates various layers within the TuMR read sensor 71 according to an embodiment of the present invention. In various embodiments of the present invention, the TuMR read sensor 71 comprises a free layer 82, a tunneling layer 84 (or barrier layer), and a pinned layer 86. The free layer 82 and the pinned layer 86 are typically magnetic layers, while the barrier layer 84 may be composed of an insulator. In various embodiments of the present invention, the tunneling barrier 84 may be made of magnesium oxide (MgO). Using a combination of a low TCR shunt resistor 90 and a TuMR read sensor 71 with a tunneling barrier 84 comprised of MgO dramatically increases a strength of a signal transmitted by the TuMR read sensor 71. In particular, the signal gain, or $\Delta R/R$ (i.e., the signal response) may be as much as 300%. In other words, the MgO tunneling layer 86 allows the TuMR read sensor 71 to send a stronger signal (i.e., more information) that not only meets current needs of data transmission, but also may be sufficient well into the future. As a result of this very high signal gain, a shunt resistor 90 with a low shunt resistance value may be used because the MgO tunneling barrier 84 creates an incredibly high signal to noise ratio (SNR), which is a ratio of useful information to noise, such that the SNR can be degraded by the shunt resistor 90 and still meet the data transmission requirements of TuMR devices.

Furthermore, not only is there a present need to reduce the total resistance of the read structure 41, and the corresponding impedance mismatch between the read structure 41, the transmission line 34, and the preamplifier 38, this need will continue to grow over time as track widths within hard disk drives decrease (i.e., hard disk drive capacity increases and/or hard disk drive size decreases). This is because as the number of tracks per inch (TPI) increases, the track width decreases, which accordingly causes the stripe height within the TuMR read sensor to decrease as well. Moreover, because resistance is approximately proportional to $TPI^2$, reducing the track width by a factor of two, for example, therefore, causes a resistance of the TuMR read sensor 71 to increase by a factor of four. Accordingly the impedance mismatch between the read structure 41, the transmission line 34, and the preamplifier 38 is, likewise, off by a factor of four, thus leading to degraded data integrity and/or failure of the TuMR read sensor 71. Likewise, as the number of tracks per inch increases so does the number of bits per inch (BPI), which increases the rate at which data is transmitted, which inherently increases the susceptibility to errors caused by pulse distortion.

Moreover, as TPI increases, so does Thermal Magnetic Noise, which is noise generated by the thermal agitation of electrons at higher data transmission rates. Thus, it may seem that the combination of a low TCR shunt resistor 90 and a TuMR read sensor 71 comprising a high ΔR/R MgO tunneling layer 84 may satisfy the high data transmission rates of TuMR devices well into the future. However, there is still a need to screen for pinholes with the TCR test so a low TCR shunt resistor 90 is needed as well.

Figure 5:
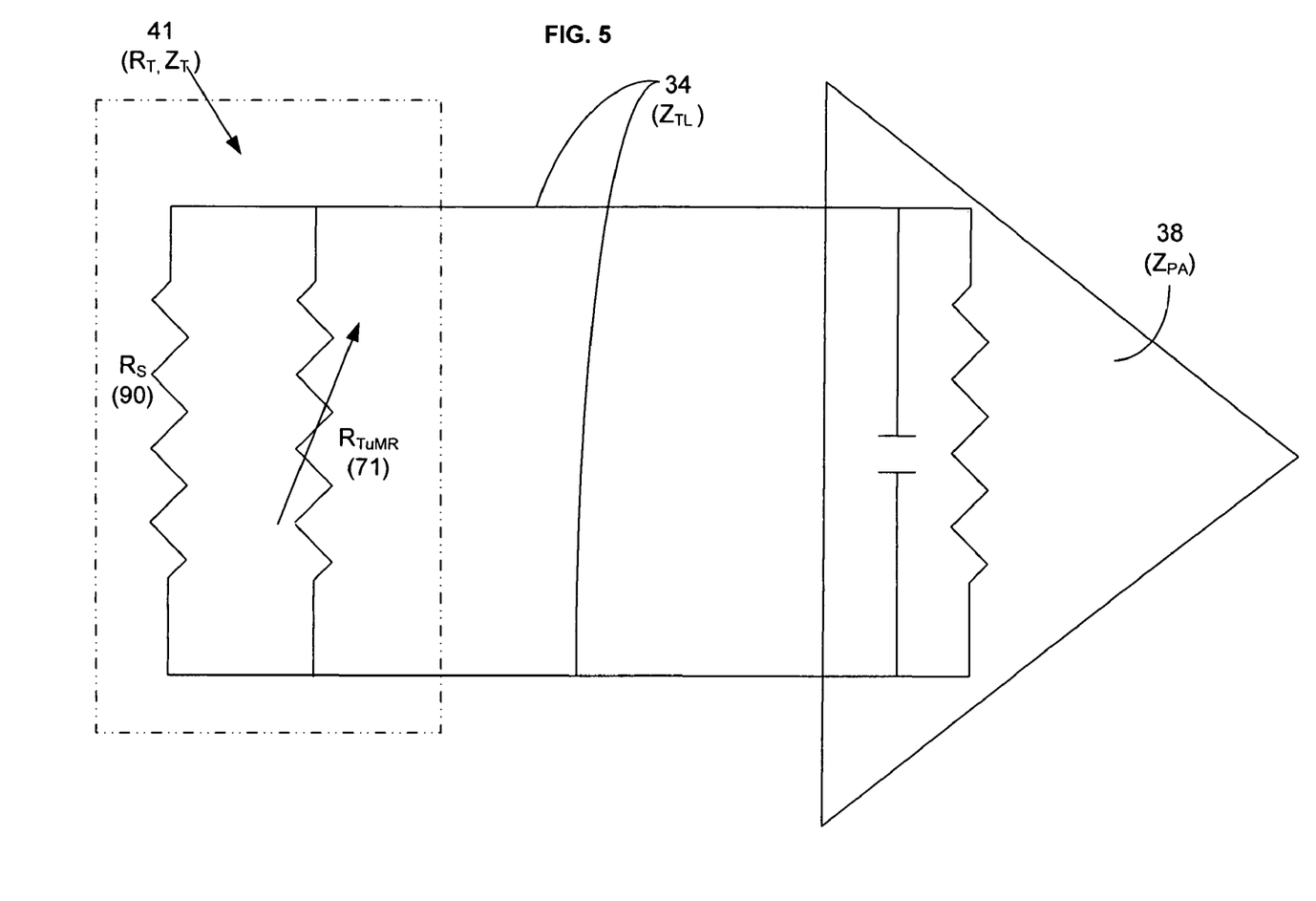
FIG. 5 illustrates an equivalent circuit schematic diagram of a read structure, a transmission line, and a preamplifier in accordance with an embodiment of the present invention.

FIG. 5 illustrates an equivalent circuit schematic diagram of the read structure 41, the transmission line 34, and the preamplifier 38 in accordance with an embodiment of the present invention. In various embodiments of the present invention, the TuMR read sensor 71 has a highly variable (due to variation in quality and stripe height) resistance value $R_{TuMR}$. The shunt resistor 90 has a resistance value $R_s$, which is a fairly known fixed value, such as 500Ω, for example. The read structure 41 has a total resistance value $R_T$, which corresponds with the parallel combination between the TuMR resistance value $R_{TuMR}$ of the TuMR read sensor 71 and the shunt resistance value $R_s$ of the shunt resistor 90. The total resistance value $R_T$ of the read structure 41 corresponds to an impedance value $Z_T$. Meanwhile, the transmission line 34 has an impedance value $Z_{TL}$ that may vary depending on composition of the transmission line 34. The preamplifier 38, likewise, has an impedance value $Z_{PA}$.

Figure 6:
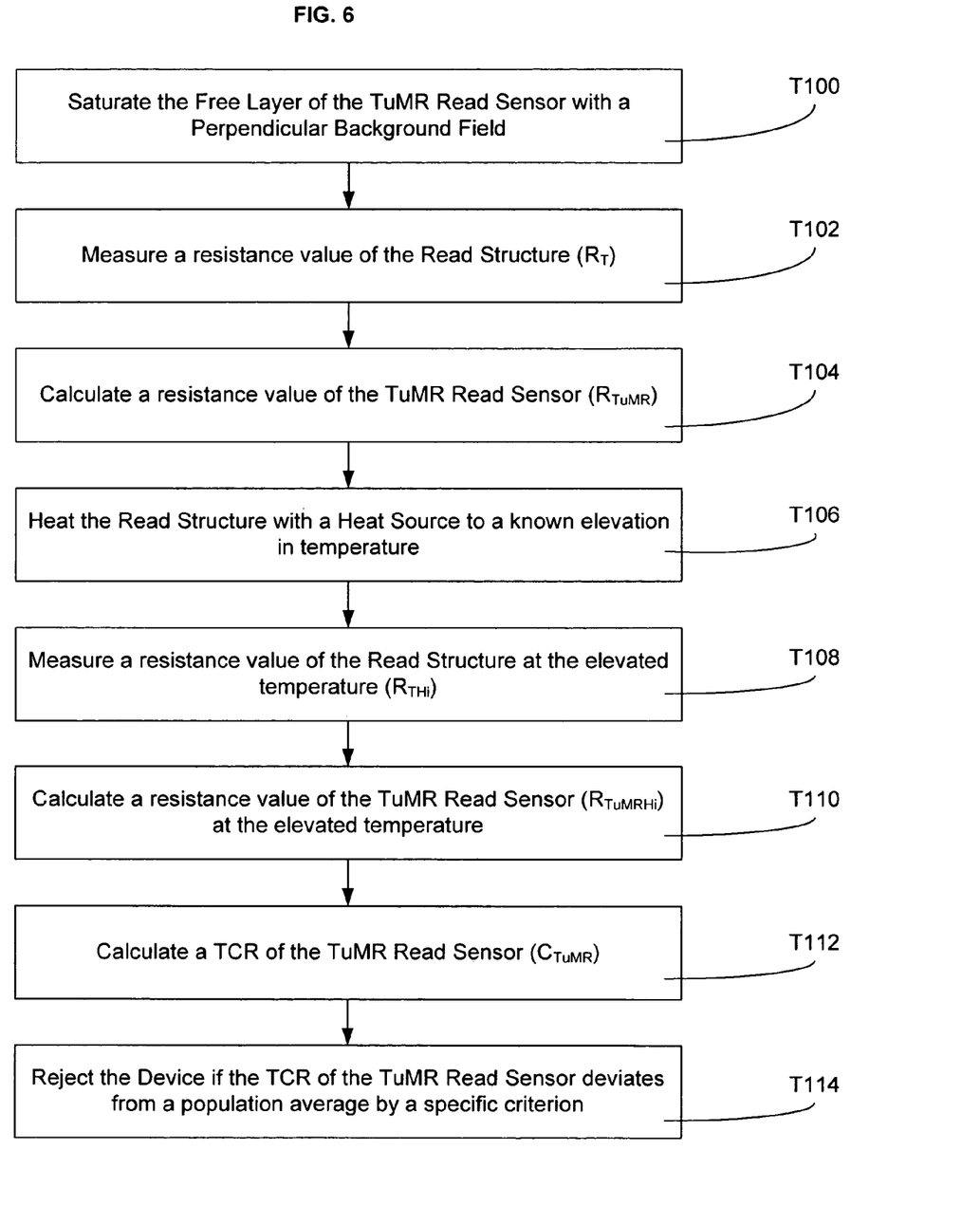
FIG. 6 illustrates a flow chart of a process for testing a quality of a TuMR read sensor in accordance with an embodiment of the present invention.

FIG. 6 illustrates a flowchart of a process for testing the quality of a TuMR read sensor, such as the TuMR read sensor 71 (refer to FIG. 3), in accordance with embodiments of the present invention. In T100, the free layer 82 may be saturated with a perpendicular background field (refer to FIG. 4). An external magnet 89, for example, may be used to apply the perpendicular background field. Typically, an electrical resistance of the TuMR read sensor 71 is a function of an angle between the magnetization in the free layer 82 and the pinned layer 86. The TuMR read sensor 71 is most resistive when the free layer 82 and the pinned layer 86 are magnetized in anti-parallel directions, and least resistive (i.e., most conductive) when the free layer 82 and the pinned layer 86 are magnetized in a parallel direction. The background field that saturates the free layer 82 will be parallel to the pinned layer 86 thus producing a stable measurement of the total resistance value $R_T$ of the read structure 41 during the heating and testing process so that the TCR can be accurately measured.

In T102, the total resistance value $R_T$ of the read structure 41 may be measured at room temperature. To obtain an accurate total resistance value $R_T$ of the read structure 41, the perpendicular background field that saturates the free layer 82 may be measured. However, there may not be a need to measure the background field so long as the field is unchanged (i.e., another magnet is not applied) and its magnitude is sufficient to saturate the free layer 82.

In T104, with the total resistance value $R_T$ of the read structure 41, the measurement of the TCR $C_{TuMR}$ of the TuMR read sensor 71 in the presence of the shunt resistor 90, which has its own TCR $C_S$, can proceed. Because the shunt resistance $R_S$ of the shunt resistor 90 has a fairly known fixed value and the TuMR resistance value $R_{TuMR}$ of the TuMR read sensor 71 are in parallel, the TuMR resistance value $R_{TuMR}$ can be calculated using a typical parallel resistor formula. That is:

$$R_{TuMR}=R_T R_S/(R_S-R_T).\qquad\text{(equation 1)}$$

Having obtained the TuMR resistance value $R_{TuMR}$ of the TuMR read sensor 71 at room temperature from Eq. 1, the measurement and calculation may be repeated at a known elevation in temperature to find a total resistance value $R_{THi}$ of the read structure 41 at the elevated temperature. In T106, the temperature increase can be accomplished with an external heater or by driving a known power into the FHA heater 78 (refer to FIG. 3), or by driving a known power into the write coil(s) 79 as discussed earlier. Using an external heater may be impractical in a manufacturing context because of the long settling time required in order to make the measurement at the elevated temperature, thus decreasing the throughput of quality testing. In T108, the total resistance value $R_{THi}$ of the read structure 41 at the elevated temperature may be measured subsequently.

Both the FHA heater 78 and the write coil 79 approach may yield faster settling times if the shunt resistor 90 is geometrically proximate to the heat source 78,79. In particular, if the shunt resistor 90 is far from the heat source 78,79 and the shunt resistor 90 has a very low TCR according to various embodiments of the present invention, then there may not be a need for the temperature of the shunt resistor 90 to equilibrate. Then the measurement can proceed quickly. Thus, a shunt resistor 90 with a low TCR may increase the throughput of the measurement process for an on-slider 32 located shunt resistor 90. Alternatively, if the shunt resistor 90 is close to the heat source 78,79, the settled increase in temperature of the shunt resistor 90 can be estimated with errors from separate engineering studies.

In T110, Eq. 1 can be used again to calculate a TuMR resistance value $R_{TuMRHi}$ of the TuMR read sensor 71 at the elevated temperature and finally the TCR of the TuMR read sensor 71 can then be calculated and used to reject suspect parts (i.e., ones that deviate from the population average by a specific criteria). That is:

$$R_{TuMRHi}=R_{THi}R_S/(R_S-R_{THi}).\qquad\text{(equation 2)}$$

In this elevated temperature calculation of the TuMR resistance value $R_{TuMRHi}$ of the TuMR read sensor 71, the errors may be compounded by the difference term in the denominator. Also, there may be additional errors from the estimation of the temperature rise of the shunt resistor 90 (which may be different from the temperature rise of the TuMR read sensor 71) and the estimation of the TCR of the shunt resistor 90 (due to manufacturing variability). These estimation errors may be compounded by the very low absolute value of the TCR of the TuMR read sensor 71, for example, −0.03%/° C. for an ideal device with an aluminum oxide barrier, and a lower absolute value for a poor device, as compared to the relatively large TCR for metals, for example 0.44%/° C. for Cu and 0.2%/° C. for NiFe typically used in thin film head processing and on slider resistor fabrication.

As discussed, using a low TCR shunt resistor 90 may be beneficial because doing so eliminates many complexities and sources of error in the measurement of the TCR of the TuMR read sensor 71, thus allowing a defective TuMR read sensor to be identified as such. Additionally, using a low TCR shunt resistor 90 can be beneficial because the temperature settling time of the shunt resistor 90 is minimized, therefore allowing for a quicker calculation of the TCR of the TuMR read sensor 71.

In T112, using Eq. 1 and Eq. 2 then yields the following equation for calculating the TCR of the TuMR read sensor 71:

$$C_{TuMR}=\{1-[R_{THi}/R_T][(R_S-R_T)/(R_S-R_{THi})]\}/\Delta T.\qquad\text{(equation 3)}$$

In T114, the TuMR read sensor 71 may be deemed defective if the TCR of the TuMR read sensor 71 deviates from a population average by a specific criterion, and if so the TuMR device is rejected. As previously discussed, the TCR of the TuMR read sensor 71 may differ from the population average if the TuMR read sensor 71 contains pinholes or nascent pinholes.

In various embodiments of the present invention, the read structure 41 may also include a top read shield 74 and a bottom read shield 76 (refer to FIG. 3). The read shields 74,76 help to protect the TuMR read sensor 71 from any stray magnetic fields originating from all magnetic bits on the corresponding disk 14, except the bit just underneath the TuMR read sensor 71. The TuMR read sensor 71 may be located at least partially between the top read shield 74 and the bottom read shield 76. In various embodiments of the present invention, the TuMR read sensor 71 may be located entirely between the top read shield 74 and the bottom read shield 76. In various embodiments of the present invention, the shunt resistor 90 may be located at least partially adjacent to at least the bottom read shield 76 or the top read shield 74. In various embodiments of the present invention, at least the bottom read shield 76 or the top read shield 74 is located at least partially between the TuMR read sensor 71 and the shunt resistor 90. In various embodiments of the present invention, at least the bottom read shield 76 or the top read shield 74 may be located entirely between the TuMR read sensor 71 and the shunt resistor 90.

In various embodiments of the present invention, the shunt resistor 71 may be made of an alloy, such as, but not limited to, $Cu_{96.5}Mn_{3.5}$, $Ni_{80}Fe_{20}$, $Cu_{60}Ni_{40}$, $Cu_{84}Mn_{12}Ni_4$, $Ni_{80}Cr_{20}$, $Ni_{60}Fe_{24}Cr_{16}$, $Cu_{88}Sn_{12}$, $Cu_{95}Sn_5$, $Cu_{91}Mn_7Fe_2$, $Au_{67}Cu_{15}Ag_{18}$, $Au_{67}Ag_{33}$, or the like.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A slider comprising:
a tunneling magneto-resistive (TuMR) read sensor; and
a shunt resistor connected in parallel to the TuMR read sensor for at least partially reducing a total resistance of a read structure of the slider;
wherein the shunt resistor is made of a material having a near zero thermal coefficient resistivity (TCR) and a resistivity of about 20 μΩcm or less.

2. The slider of claim 1,
wherein the shunt resistor is made of a material having a TCR where the absolute value of the TCR is less than about 0.2%/° C.

3. The slider of claim 2,
wherein the shunt resistor is made of a material having a negative TCR.

4. The slider of claim 1,
wherein the shunt resistor is located in a head part of the slider.

5. The slider of claim 1,
wherein a total resistance value ($R_T$) of the read structure of the slider is based on a parallel combination of a shunt resistance value ($R_S$) of the shunt resistor and a TuMR resistance value ($R_{TuMR}$) of the TuMR read sensor.

6. The slider of claim 1,
wherein the read structure of the slider is configured for use with a transmission line and a preamplifier; and
wherein the shunt resistor is configured to reduce an impedance mismatch between the read structure of the slider the transmission line, and the preamplifier.

7. The slider of claim 1, further comprising:
a heat source for raising a temperature of the read structure by a known elevation.

8. The slider of claim 7,
wherein the heat source comprises one of a fly height adjustment (FHA) heater and a write coil.

9. The slider of claim 1, the TuMR read sensor comprising:
at least a free layer;
at least a pinned layer; and
at least a tunneling layer located between the free layer and the pinned layer.

10. The slider of claim 9,
wherein the tunneling layer comprises MgO.

11. The slider of claim 1, the read structure of the slider further comprising:
at least two read shields for at least partially shielding the TuMR read sensor from stray magnetic fields;
wherein the TuMR read sensor is located at least partially between the at least two read shields; and
wherein the shunt resistor is located at least partially adjacent to at least one of the at least two read shields.

12. The slider of claim 11,
wherein at least one of the at least two read shields is located at least partially between the TuMR read sensor and the shunt resistor.

13. The slider of claim 1, wherein the shunt resistor is formed of a material selected from the group consisting of $Cu_{96.5}Mn_{3.5}$, $Ni_{80}Fe_{20}$, $Cu_{88}Sn_{12}$, $Cu_{95}Sn_5$, $Cu_{91}Mn_7Fe_2$, $Au_{67}Cu_{15}Ag_{18}$ and $Au_{67}Ag_{33}$.

14. A sensing system, comprising:
a tunneling magneto-resistive (TuMR) read sensor; and
a shunt resistor connected in parallel to the TuMR read sensor;
wherein:
the shunt resistor is made of a material having a near zero thermal coefficient of resistivity (TCR);
the TuMR read sensor is located at least partially between a first read shield and a second read shield;
the first read shield and the second read shield allow for at least partially shielding the TuMR read sensor from stray magnetic fields; and
the shunt resistor is located outside of an area that is between the first read shield and the second read shield.

15. The sensing system of claim 14,
wherein the TuMR read sensor is included in a read structure; and
wherein the shunt resistor at least partially reduces a total resistance of the read structure.

16. The sensing system of claim 14,
wherein the shunt resistor is made of a material having a particular TCR; and
wherein an absolute value of the particular TCR is less than about 0.2%/° C.

17. The sensing system of claim 14,
wherein the shunt resistor is made of a material having a negative TCR.

18. The sensing system of claim 14, wherein the TuMR read sensor comprises:
a free layer;
a pinned layer; and
a tunneling layer located between the free layer and the pinned layer.

19. The sensing system of claim 18,
wherein the tunneling layer comprises MgO.

20. The sensing system of claim 14, wherein:
the TuMR read sensor and the shunt resistor are incorporated in a read structure of a disk drive; and
a total resistance value of the read structure is based on a parallel combination of a shunt resistance value of the shunt resistor and a particular resistance value of the TuMR read sensor.

21. The sensing system of claim 20,
wherein the disk drive further includes:
- a transmission line; and
- a preamplifier connected to the transmission line; and wherein the read structure is connected to the transmission line.

22. The sensing system of claim 21,
wherein the shunt resistor is configured to reduce an impedance mismatch between the read structure, the transmission line, and the preamplifier.

23. The sensing system of claim 21, wherein the disk drive further includes:
- a heat source for raising a temperature by a predetermined amount.

24. The sensing system of claim 23,
wherein the heat source comprises one of a fly height adjustment (FHA) heater and a write coil.

25. The sensing system of claim 14,
wherein at least one of the first read shield and the second read shield is located at least partially between the TuMR read sensor and the shunt resistor.

26. The sensing system of claim 14, wherein the shunt resistor is formed of a material selected from the group consisting of $Cu_{96.5}Mn_{3.5}$, $Ni_{80}Fe_{20}$, $Cu_{95}Sn_{12}$, $Cu_{95}Sn_5$, $Cu_{91}Mn_7Fe_2$, $Au_{67}Cu_{15}Ag_{18}$ and $Au_{67}Ag_{33}$.

27. A slider comprising:
- a tunneling magneto-resistive (TuMR) read sensor;
- a shunt resistor connected in parallel to the TuMR read sensor for at least partially reducing a total resistance of a read structure of the slider, wherein the shunt resistor is made of a material having a near zero thermal coefficient resistivity (TCR); and
- at least two read shields for at least partially shielding the TuMR read sensor from stray magnetic fields;

wherein:
- the TuMR read sensor is located at least partially between the at least two read shields;
- the shunt resistor is located at least partially adjacent to at least one of the at least two read shields; and
- at least one of the at least two read shields is located at least partially between the TuMR read sensor and the shunt resistor.

28. The slider of claim 27,
wherein the shunt resistor is made of a material having a TCR, the absolute value of which is less than about 0.2%/° C.

29. The slider of claim 27, wherein the shunt resistor is formed of a material having a resistivity of about 20 μΩcm or less.

30. The slider of claim 27, wherein the shunt resistor is formed of a material selected from the group consisting of $Cu_{96.5}Mn_{3.5}$, $Ni_{80}Fe_{20}$, $Cu_{88}Sn_{12}$, $Cu_{95}Sn_5$, $Cu_{91}Mn_7Fe_2$, $Au_{67}Cu_{15}Ag_{18}$ and $Au_{67}Ag_{33}$.

* * * * *